UNITED STATES PATENT OFFICE.

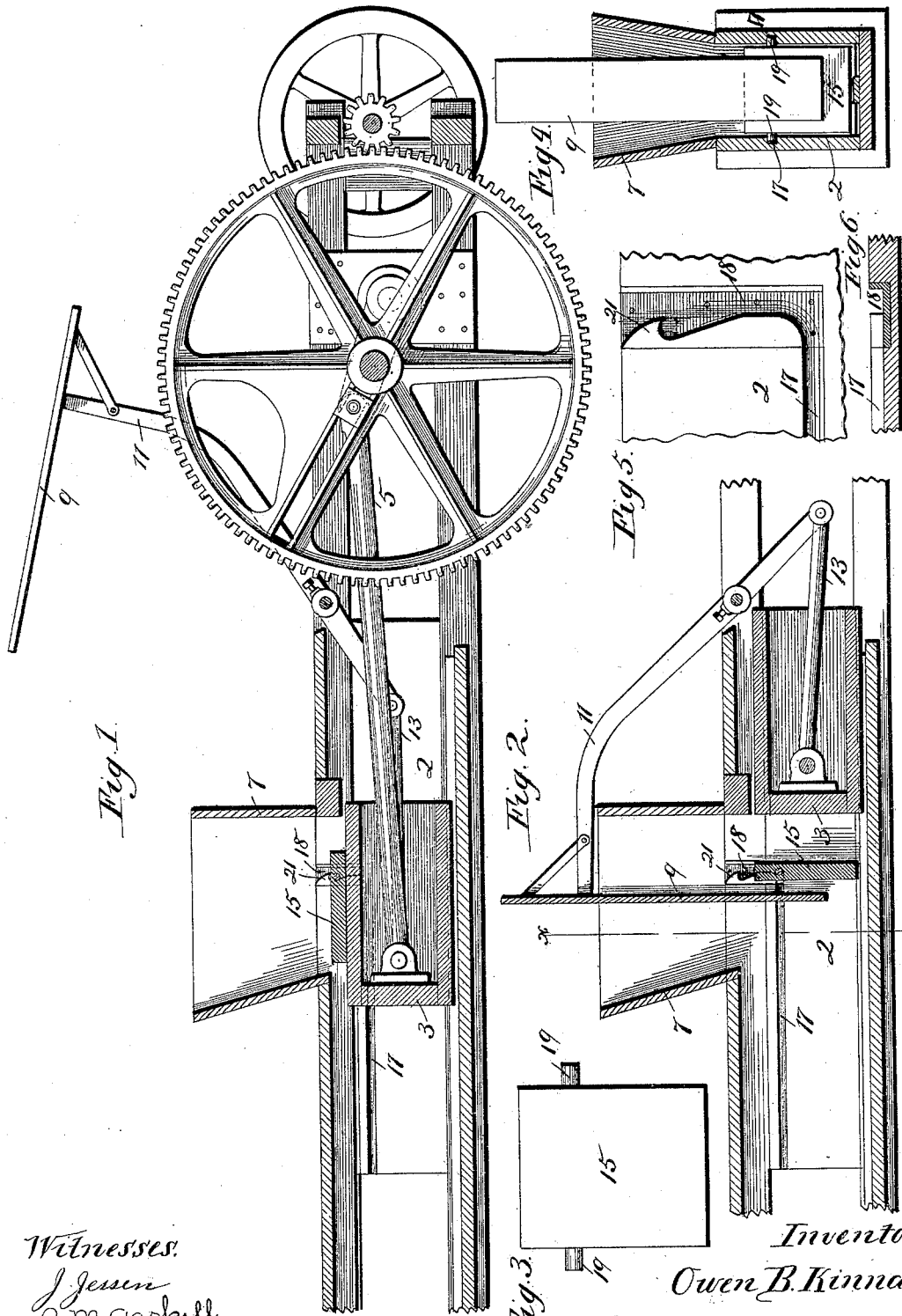

OWEN B. KINNARD, OF MINNEAPOLIS, MINNESOTA, ASSIGNOR TO THE KINNARD PRESS COMPANY, OF SAME PLACE.

BALING-PRESS.

SPECIFICATION forming part of Letters Patent No. 431,471, dated July 1, 1890.

Application filed September 21, 1889. Renewed June 7, 1890. Serial No. 354,550. (No model.)

*To all whom it may concern:*

Be it known that I, OWEN B. KINNARD, of Minneapolis, in the county of Hennepin and State of Minnesota, have invented certain new and useful Improvements in Baling-Presses, of which the following is a specification.

The object of this invention is to provide a baling-press that is used for baling hay or similar material with an automatic feeder for feeding the material into the baling-chamber, and also with improved means for inserting into a continuous baling-chamber partition-boards for separating or dividing the bales of material.

The invention consists, generally, in the construction and combination hereinafter described, and particularly pointed out in the claims.

In the accompanying drawings, forming part of this specification, Figure 1 is a longitudinal vertical section of a portion of a baling-press having my invention applied thereto. Fig. 2 is a similar view of a portion of the chamber, showing the plunger retracted and the partition-board inserted in front of the plunger. Fig. 3 is a front elevation of the partition-board. Fig. 4 is a transverse vertical section on line x x of Fig. 2. Figs. 5 and 6 are details showing the groove that guides the partition-board.

In the drawings, 2 represents a suitable baling-chamber, within which is arranged a plunger 3, to which is connected a pitman 5. This plunger is preferably operated through suitable gearing, substantially as described in Patent No. 377,942, issued to me February 14, 1888, although, so far as the present invention is concerned, it may be used in connection with a baling-press in which the plunger is operated by any suitable means.

The baling-chamber 2 is preferably provided upon its upper side with a suitable opening surrounded by a hopper 7, through which the hay or other material to be baled is fed into the baling-chamber.

For the purpose of automatically feeding the material into the baling-chamber I provide an automatic feeder, which, each time the plunger is retracted, passes down through the hopper and into the baling-chamber in front of the plunger, thereby forcing any material there may be in the hopper into said baling-chamber. This feeder consists, preferably, of a plate 9, mounted upon or secured to a lever 11, that is pivoted, preferably, upon the frame of the baling-chamber and has its rear end connected to the plunger by a suitable connecting-rod 13. The plate 9, when the plunger is advanced in the baling-chamber, is moved away from the hopper 7 in substantially the position shown in Fig. 1, and as the plunger is retracted the plate 9 moves down through the hopper 7, pushing the hay or other material in the hopper into the baling-chamber in front of the plunger 3, the plate then assuming substantially the position shown in Fig. 2.

For the purpose of separating or dividing the bundles in the baling-chamber I provide partition-boards 15, which are placed in the baling-chamber, and thus separate the material therein. I provide upon the inner walls of the chamber horizontal grooves 17, that extend to a point beneath the hopper, where they join vertical grooves 18, that extend to the top of the walls of the chamber. The side walls of the hopper are preferably flared outwardly, as shown in Fig. 4. The partition-boards 15 are provided with the pins or studs 19, which project from the opposite edges thereof.

To place the division-boards 15 in position in the baling-chamber, each board is dropped into the hopper 7 when the plunger is in its forward position, as shown in Fig. 1, and the pins 19 upon the division-boards are brought into the top of the vertical groove 18. When the plunger is retracted, these pins pass down to the ends of the grooves 17, and as the plate 9 passes down through the hopper the board is brought into the vertical position shown in Fig. 2, and as the plunger is advanced the board moves in front of it through the baling-chamber, the pins 19 passing along in the groove 17.

For the purpose of preventing the board from moving upward, so as to bring the pins out of the grooves 18, I prefer to provide the hooks 21, which are formed in the wall of said grooves and are adapted to engage the pins 19 and prevent them from passing upward and disengaging from said grooves.

The division-board is so constructed that in combination with the vertical groove 18 it may be dropped loosely into the bottom of the hopper and directly upon the top of the plunger while it is making the stroke on a former bale. Then when the plunger returns it leaves an opening directly beneath the division-board, which now is under the hay or other material which has been placed into the hopper. As the plunger returns, it carries the lever-controlled feeder down upon the material in the hopper and pushes it, together with the division-board, down into the baling-chamber. As the division is pressed down into the baling-chamber by the feeder 9, it is stopped by the pins in the edges striking the end of the vertical groove, and, the pressure being continued by the returning plunger, the division is caused to rotate until it assumes a vertical position. It can be readily seen that by one stroke with my device I not only feed the machine with its supply of material, but place the division-board in place between the hay and the plunger without waiting for the stroke to be completed.

I claim as my invention—

1. In a baling-press, the combination, with a movable plunger, of a baling-chamber, the upper wall of which is provided with an opening to admit the insertion of the material to be baled, the two side walls being provided with connecting vertical and longitudinal grooves, and division-boards provided with pins or projections adapted to engage said grooves, said division-boards being adapted to be placed in a longitudinal position in the bottom of the hopper.

2. The combination, with the movable plunger 3, of the baling-chamber, the side walls of which are provided with longitudinal and vertical connecting-grooves 17 and 18 and the upper wall of which is provided with an opening for the insertion of material into the baling-chamber, and the partition-board 15, provided with the pins 19, adapted to be inserted in said grooves, substantially as described.

3. The combination, with the movable plunger, of the baling-chamber, the side walls of which are each provided with a continuous vertical and longitudinal groove from an opening in the upper wall to the end of the chamber and adapted to receive a partition-board, the partition-board provided with pins in its sides placed nearer one end than the other and adapted to enter said grooves, and the lever 11, provided with the feeding-plate 9, substantially as described.

4. The combination, with the plunger, of the chamber provided with the grooves 17 and 18 and the hook 21 in the wall of said grooves 18, and the division-board 15, provided with the projections 19, adapted to engage said grooves, substantially as described.

5. In a baling-press, the combination of a hopper, a division-board adapted to be placed horizontally in the bottom of the hopper and provided with pins in its side edges nearer one end than the other, and a baling-chamber having side walls vertically and horizontally grooved, adapted to receive said pins, and so arranged as to permit said division-board being pushed into said baling-chamber between the inserted material and the plunger.

In testimony whereof I have hereunto set my hand this 17th day of September, 1889.

OWEN B. KINNARD.

In presence of—
A. M. GASKILL,
BESSIE BOOTH.